Patented June 16, 1953

2,642,430

UNITED STATES PATENT OFFICE 2,642,430

HYDROXY SUBSTITUTED ALIPHATIC ETHER DERIVATIVES OF NITROGEN HETEROCYCLICS

Paul M. Downey, Nitro, W. Va., assignor to Monsanto Chemical Company, St. Louis, Mo., a corporation of Delaware No Drawing. Application April 27, 1949, Serial No. 90,052

13 Claims. (Cl. 260—289)

This invention relates to new and novel compositions of matter. More particularly it relates to hydroxy substituted aliphatic ether derivatives of nitrogen heterocyclics of the general formula:

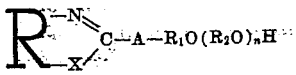

where R is an ortho arylene radical, where X is selected from the group consisting of —S—, —O—, —NH—, and —CH=CH—, where A is selected from the group consisting of —S—, —O—, and —NH—, where X and A are unlike but where X or A is a sulfur atom, and where $R_1$ and $R_2$ are like or unlike alkylene groups, and where $n$ is an integer. The alkylene groups $R_1$ and $R_2$ may contain substituents such as hydroxyl groups.

These new compounds are particularly useful as inhibitors or regulating agents in metal pickling baths and are readily prepared by introducing hydroxy aliphatic ether radicals into such compounds as 2-amino benzothiazole, 2-amino-4-phenyl benzothiazole, 2-hydroxy benzothiazole, 2-hydroxy-4-methyl benzothiazole, 2-mercapto benzoxazole, 2-mercapto naphthoxazole, 2-mercapto-4-phenyl benzoxazole, 2-mercapto benzimidazole, 2-mercapto quinoline, 2-mercapto-4-methyl quinoline, and the various analogues and homologues thereof.

The introduction of hydroxy aliphatic ether substituents may be readily effected by condensing the above described heterocyclics with compounds such as ethylene oxide, propylene oxide, glycide, epichlorhydrin, trimethylene chlorhydrin, glycerol alpha chlorhydrin, glycol, glycerine, polyglycerine, and the like. Two or more of these reactive compounds may also be caused to react consecutively. The condensation is advantageously carried out in the presence of alkaline reacting agents or nickel sulfate as catalysts.

As exemplary of the preparation of the new compounds the following is illustrative but in no wise is to be construed as limitative thereof.

Example 1

75.5 parts by weight (substantially 0.5 mol) of 2-mercapto benzoxazole was dissolved in 400 parts by weight of a 5% sodium hydroxide solution, filtered, and the filtrate placed in a 3-neck flask equipped with a stirrer and thermometer. Upon addition of 40.2 parts by weight (substantially 0.5 mol) of ethylene chlorhydrin the mix was heated with stirring for about 3 hours at 60°–65° C. A soft brown sticky mass developed which upon separation from the reaction mix was found to be insoluble in dilute hydrochloric acid but soluble in benzene and believed to be the equimolecular condensation product represented by the formula

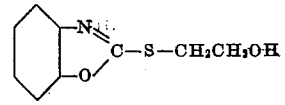

30.5 parts by weight (substantially 0.16 mol) of the brown sticky equimolecular condensation product was mixed with 0.3 part by weight of potassium hydroxide in a suitable reaction vessel and thereto, with agitation at a temperature above 100° C., ethylene oxide was added through an Alundum thimble. By the addition of various amounts of ethylene oxide a series of liquid reaction products of the general formula

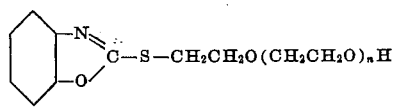

where $n$ is an integer was obtained. The new compounds were soluble in most organic solvents and solubility in cold dilute hydrochloric acid increased with increasing values of $n$.

Example 2

37.8 parts by weight (substantially 0.25 mol) of 2-hydroxy benzothiazole was dissolved in 200 parts by weight of a 5% sodium hydroxide solution, filtered, and the filtrate placed in a 3-neck flask equipped with a stirrer and thermometer. Upon addition of 20.1 parts by weight (substantially 0.25 mol) of ethylene chlorhydrin the mix was heated with stirring for about 3 hours at 60°–65° C. A viscous light brown syrupy substance developed which upon separation from the reaction mix was found to be insoluble in dilute hydrochloric acid but soluble in chloroform and believed to be the equimolecular condensation product represented by the empirical formula $C_7H_4NSO—CH_2CH_2OH$.

The equimolecular condensation product was admixed with a small quantity of potassium hydroxide in a suitable reaction vessel and heated to about 141° C. Thereupon various amounts of ethylene oxide were admitted to the melt through an Alundum thimble and a series of liquid reaction products of the general formula

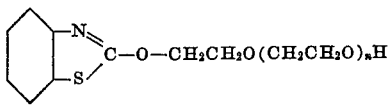

where $n$ is an integer was obtained. The new compounds were soluble in most organic solvents and as the ether content of the molecule increased the solubility of the reaction products in cold dilute hydrochloric acid increased also.

Example 3

Propylene oxide was added to a suitable reaction vessel containing 2-hydroxy benzothiazole and a relatively small amount of potassium hydroxide. The equimolecular reaction product

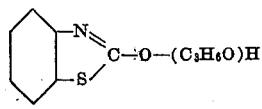

obtained by heating equal molar proportions of propylene oxide and hydroxy benzothiazole for one hour at 155° C.–175° C. was insoluble in dilute hydrochloric acid. However, further reacting the equimolecular reaction product with propylene oxide produced poly ether reaction products of the general formula

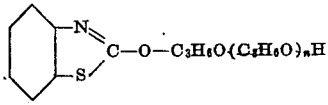

where $n$ is an integer, which were soluble in dilute mineral acids and most organic solvents.

Example 4

22.5 parts by weight (substantially 0.15 mol) of 2-amino benzothiazole was mixed with 0.2 part by weight of potassium hydroxide in a suitable reaction vessel and the mass heated to 140° C. To the melt, through an Alundum thimble, was added various amounts of ethylene oxide and a series of liquid reaction products was obtained which may be presented by the general formula

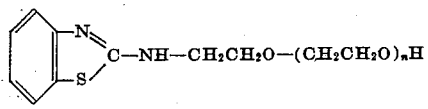

where $n$ is one or more which were completely soluble in cold dilute mineral acids and exhibited solubility in most organic solvents.

Example 5

24.0 parts by weight (substantially 0.15 mol) of 2-mercapto quinoline was mixed with 0.2 part by weight of potassium hydroxide and the mass heated to about 200° C. Various amounts of ethylene oxide were admitted to the melt through an Alundum thimble and a series of liquid reaction products of the general formula

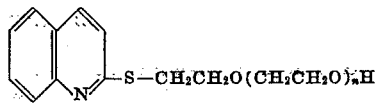

where $n$ is an integer was obtained. The new materials were soluble in most organic solvents and as $n$ increased the solubility in cold mineral acids increased also.

Example 6

50 parts by weight (substantially 0.32 mol) of 2-mercapto benzimidazole was dissolved in a 5% sodium hydroxide solution, filtered, and the filtrate placed in a 3-neck flask equipped with a stirrer and thermometer. Upon addition of 31.5 parts by weight (substantially 0.33 mol) of trimethylene chlorhydrin the mix was heated with stirring for about three hours at 60°–65° C. A cream colored solid, M. P. 110°–113° C., developed which upon separation from the reaction mix was found to be insoluble in dilute hydrochloric acid and believed to be the equimolecular condensation product represented by the empirical formula $C_7H_5N_2S$—$CH_2CH_2CH_2OH$.

The equimolecular condensation product was mixed with a small amount of potassium hydroxide, placed in a suitable reaction vessel, heated above 110 C., and thereto was admitted various amounts of ethylene oxide through an Alundum thimble. A series of liquid reaction products of the general formula

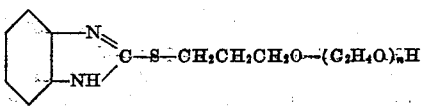

where $n$ is an integer was obtained. The new materials were soluble in most organic solvents and as the number of ether groups increased the solubility in cold dilute mineral acids increased also.

As illustrative of the utility of the new materials and not limitative thereof, typical examples of the new class of materials were employed in a metal pickling process in amounts normally employed under conditions which duplicated, so far as possible, those commonly followed in commercial practice. Portions, namely 0.012% and 0.03% by weight based upon the weight of the pickling bath, of the new class of compounds were incorporated in pickling baths and evaluated in the following manner: A test piece of 28 gauge hot rolled tin plate steel stock, approximately 4″ x 3″ in dimension, was immersed in the pickling bath comprising substantially 750 cc. of a water solution containing approximately 6% by weight of 66° Bé. sulfuric acid and a small amount of one of the new compounds above described. The temperature of the bath was maintained at substantially 80° C. The steel test piece after thoroughly cleaning and pre-pickling for a few minutes in the absence of inhibitor and drying was weighed before immersion in the bath, and after 40 minutes' pickling the test piece was again weighed, the difference between the two weights representing the metal loss during pickling. The metal loss compared with the metal loss of a similar test piece treated in an analogous manner but without the use of any inhibitor provides a measure of the inhibiting value of the compound employed. The results obtained on testing typical examples of the preferred class of materials are given in the following table. The metal loss is reported as the average of duplicate determinations.

While $n$ in the table below is a whole number for any given molecule, it is convenient to designate $n$ as a function of the average molecular weight or more particularly the total molecular weight equivalents actually reacted with each heterocyclic compound. Accordingly, the value of $n$ is the number of mols reacted per mol of heterocyclic compound and therefore assumes fractional values.

| Inhibitor | Value of $n$ | Percent By Weight of Inhibitor Employed | Weight Loss of Metal in Grams | Remarks |
|---|---|---|---|---|
| 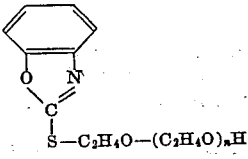 | 2.86<br>9.40 | 0.012<br>0.03<br>0.012<br>0.03 | .0099<br>.0074<br>.0074<br>.0073 | Completely soluble in pickling bath at 80° C. Pickled strips clean and bright. |
| 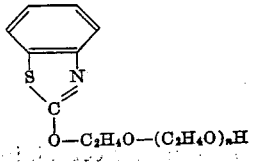 | 2.82<br>4.47 | 0.012<br>0.03<br>0.012<br>0.03 | .0091<br>.0068<br>.0112<br>.0093 | Do. |
| 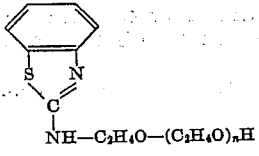 | 4.12 | 0.012<br>0.03 | .0164<br>.0161 | Do. |
| 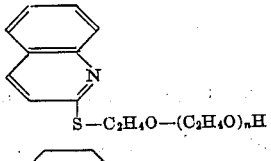 | 5.3 | 0.012<br>0.03 | .0130<br>.0137 | Do. |
| 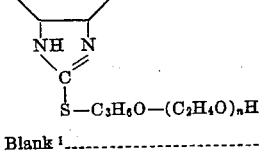 | 3.1 | 0.012<br>0.03 | .0174<br>.0172 | Do. |
| Blank [1] | | | .7764 | Strips pitted. |

[1] No inhibitor.

It is obvious from the data set forth that an exceptional class of liquid pickling inhibitors is presented the art. Comparing the loss in weight of the steel test strips to the loss when no inhibitor is employed, it is apparent that a great saving in metal is effected by the employment of these new materials as pickling inhibitors.

While the new compositions wherein $n$ is one possess pickling inhibiting properties, it has been found in general that values of $n$ of 2–25 are to be preferred in amounts normally employed in commercial practice. Compositions containing approximately 10 ether groups have been found both efficient and economical.

The hydroxy substituted aliphatic derivatives of the above described heterocyclics wherein $n$ is 25–40 are slightly soluble in water and possess detergent properties. Further, the new compositions containing 20 or more ether groups may be used as emulsifiers or wetters in non-aqueous systems.

While the invention has been illustrated by a number of specific embodiments of the invention, it will be apparent that many variations may be made from the specific procedures described and from the particular reactants and catalysts employed without departing from the spirit or scope of the invention.

What is claimed is:

1. As a new composition of matter a compound of the structure

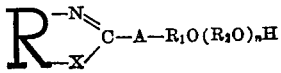

where R is an ortho arylene radical; where

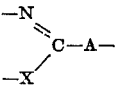

is selected from the group consisting of

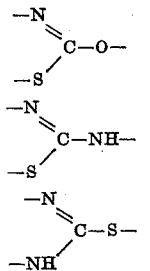

and

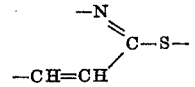

where $R_1$ and $R_2$ are alkylene groups containing at least two but less than four carbon atoms; and where $n$ is an integer at least 1 but not more than 40.

2. As a new composition of matter a compound of the structure

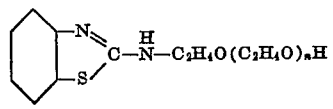

where $n$ is an integer from 2 to 25.

3. As a new composition of matter a compound of the structure

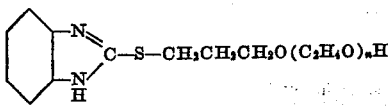

where $n$ is an integer at least 1 but less than 40.

4. As a new composition of matter a compound of the structure

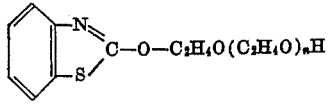

where $n$ is an integer from 2 to 25.

5. As a new composition of matter a compound of the structure

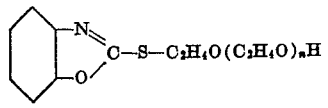

where $n$ is an integer from 2 to 25.

6. As a new composition of matter a compound of the structure

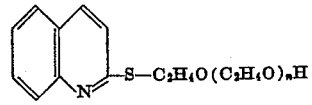

where $n$ is an integer from 2 to 25.

7. As a new composition of matter a compound of the structure

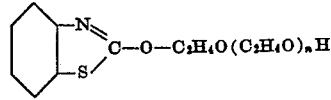

where $n$ is approximately 10.

8. As a new composition of matter a compound of the structure

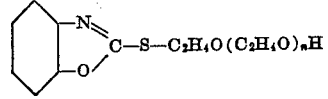

where $n$ is approximately 10.

9. As a new composition of matter a compound of the structure

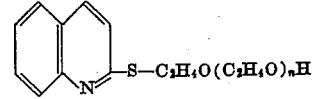

where $n$ is approximately 10.

10. As a new composition of matter a compound of the structure

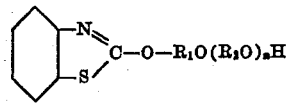

where $R_1$ and $R_2$ are alkylene groups containing more than one but less than four carbon atoms and where $n$ is an integer at least 1 but not more than 40.

11. As a new composition of matter a compound of the structure

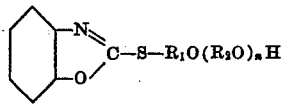

where $R_1$ and $R_2$ are alkylene groups containing more than one but less than four carbon atoms and where $n$ is an integer at least 1 but not more than 40.

12. As a new composition of matter a compound of the structure

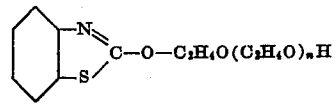

where $n$ is an integer at least 1 but not more than 40.

13. As a new composition of matter a compound of the structure

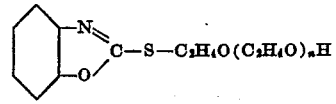

where $n$ is an integer at least 1 but not more than 40.

PAUL M. DOWNEY.

References Cited in the file of this patent

UNITED STATES PATENTS

| Number | Name | Date |
| --- | --- | --- |
| 1,990,963 | Teppema | Feb. 12, 1935 |
| 2,335,271 | Graenacher et al. | Nov. 30, 1943 |
| 2,352,078 | Coleman et al. | June 20, 1944 |
| 2,378,551 | Hentrich et al. | June 19, 1945 |